US012547180B2

(12) United States Patent
Ramos Cantor et al.

(10) Patent No.: US 12,547,180 B2
(45) Date of Patent: Feb. 10, 2026

(54) CONTROLLER, AUTOMATED GUIDED VEHICLES AND METHOD OF GUIDING A PLATOON OF AUTOMATED GUIDED VEHICLES

(71) Applicant: Robert Bosch GmbH, Stuttgart (DE)

(72) Inventors: Oscar Dario Ramos Cantor, Hildesheim (DE); Sarah Uttendorf, Hannover (DE); Monique Duengen, Hannover (DE)

(73) Assignee: ROBERT BOSCH GMBH, Stuttgart (DE)

( * ) Notice: Subject to any disclaimer, the term of this patent is extended or adjusted under 35 U.S.C. 154(b) by 204 days.

(21) Appl. No.: 17/662,381

(22) Filed: May 6, 2022

(65) Prior Publication Data
US 2022/0382297 A1   Dec. 1, 2022

(30) Foreign Application Priority Data

May 31, 2021 (EP) ..................................... 21176816

(51) Int. Cl.
*B60W 60/00* (2020.01)
*B60W 30/165* (2020.01)
*G05D 1/00* (2006.01)
*G05D 1/02* (2020.01)
*G08G 1/0967* (2006.01)
(Continued)

(52) U.S. Cl.
CPC ....... *G05D 1/0287* (2013.01); *B60W 60/0015* (2020.02); *B60W 2554/4041* (2020.02); *B60W 2556/45* (2020.02)

(58) Field of Classification Search
CPC ............ G05D 1/0287; B60W 60/0015; B60W 2556/45
See application file for complete search history.

(56) References Cited

U.S. PATENT DOCUMENTS

2017/0327151 A1* 11/2017 Nordbruch .......... B60W 30/165
2019/0049991 A1*  2/2019 Laur ................... B60W 30/165
(Continued)

FOREIGN PATENT DOCUMENTS

WO       2019201801 A1    10/2019

OTHER PUBLICATIONS

Dafflon, et al.: "Adaptive Autonomous Navigation using Reactive Multi-agent System for Control Law Merging," Procedia Computer Science, 51 (2015), pp. 423-432.

*Primary Examiner* — Scott A Browne
*Assistant Examiner* — Rami Nabih Bedewi
(74) *Attorney, Agent, or Firm* — NORTON ROSE FULBRIGHT US LLP

(57) ABSTRACT

A controller, first automated guided vehicle, second automated guided vehicle and methods of guiding a platoon of automated guided vehicles. The method includes providing by the controller a first target position and a first target orientation to the first automated guided vehicle having sensors used for person safety and navigation that is configurable or configured to lead a platoon of automated guided vehicles, and sending by the controller to the second automated guided vehicle not having sensors used for person safety and navigation a command to join the platoon of automated guided vehicles and/or to follow the first automated guided vehicle in the platoon of automated vehicles.

8 Claims, 6 Drawing Sheets

(51) Int. Cl.
*G08G 1/0968* (2006.01)
*G08G 1/16* (2006.01)

(56) References Cited

U.S. PATENT DOCUMENTS

2020/0211401 A1\* 7/2020 Oshida ................. G05D 1/0295
2020/0332483 A1\* 10/2020 Michiharu ........... G05D 1/0261

\* cited by examiner

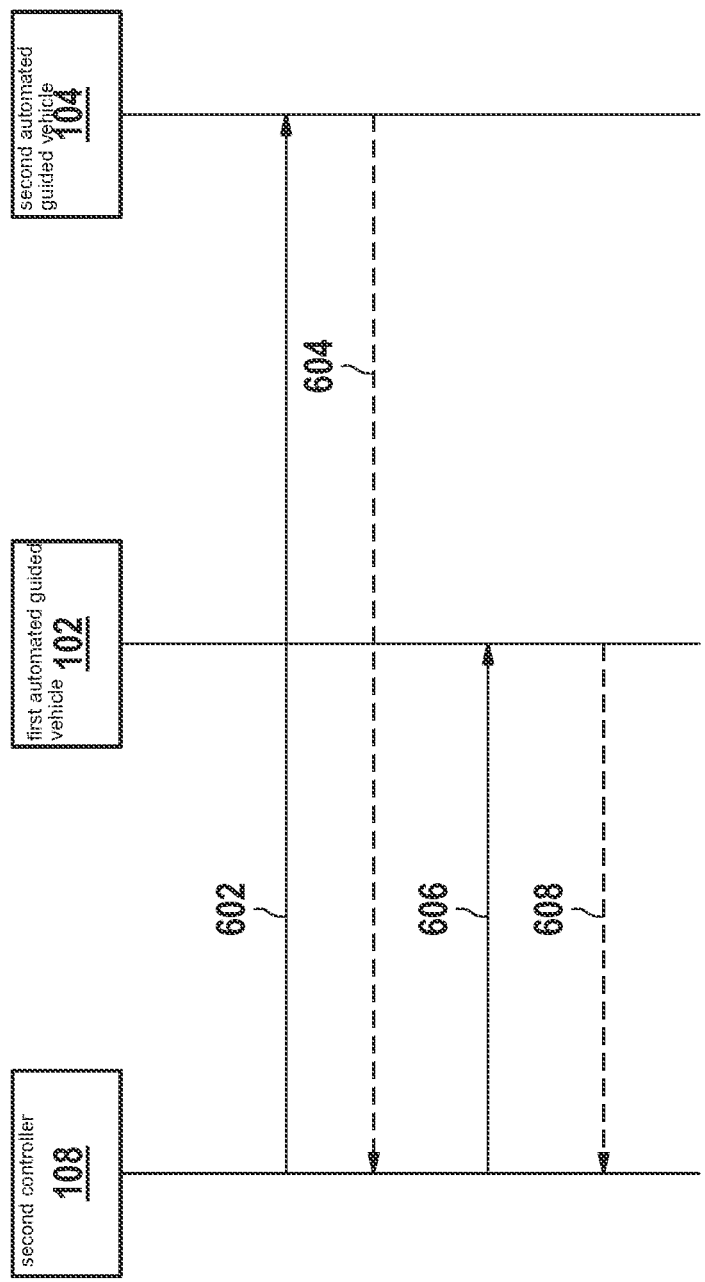

CONTROLLER, AUTOMATED GUIDED VEHICLES AND METHOD OF GUIDING A PLATOON OF AUTOMATED GUIDED VEHICLES

CROSS REFERENCE

The present application claims the benefit under 35 U.S.C. § 119 of European Patent Application No. EP 21 17 6816.3 filed on May 31, 2021, which is expressly incorporated herein by reference in its entirety.

FIELD

The present invention concerns a controller, automated guided vehicles and method of operating the same.

SUMMARY

The controller, the automated guided vehicles and the method of operating the same according to an example embodiment of the present invention provide a hybrid platoon of automated guided vehicles. The platoon can be built between an automated guided vehicle with sensors used for person safety and navigation and two or more automated guided vehicles without them, due to a tight communication between the automated guided vehicles and the platoon controller. A communication technology used, i.e. vehicle-to-vehicle or vehicle-to-infrastructure depends mainly on the location of the platoon controller and the support of the automated guided vehicles. If the platoon controller is implemented in a first automated guided vehicle that is leading the platoon, no external communication is required between the controller and the first automated guided vehicle. Communication with the following automated guided vehicles of the platoon takes place, then, through one of the supported communication technologies.

Safety measures occur at the first automated guided vehicle independently of the platoon controller. The platoon controller must control the following automated guided vehicles, since they lack of the sensors used for person safety that the first automated guided vehicle has. This is in one aspect done over an emergency-stop signal that may have higher processing priority and stronger deceleration values as a normal stop operation.

In accordance with an example embodiment of the present invention, a controller for guiding a platoon of automated guided vehicles is configured to provide a first target position and a first target orientation to a first automated guided vehicle having sensors for person safety and navigation that is configurable or configured to lead a platoon of automated guided vehicles, and wherein the controller is configured to send to a second automated guided vehicle not having sensors for person safety and navigation a command to join the platoon of automated guided vehicles and/or to follow the first automated guided vehicle in the platoon of automated vehicles. A sensor used for person safety and navigation may comprise a laser scanner, and logical functionality to detect obstacles and their distances. A sensor used for person safety can also be used for navigation and/or localization. The first automated guided vehicle is a designated leading vehicle, the second automated guided vehicle is a vehicle designated to follow a leading vehicle. The platoon has one leading vehicle and may have a plurality of vehicles that are designated to follow the leading vehicle. The second automated guided vehicle not necessarily is a second vehicle in the order in which the vehicles move in the platoon. The platoon is led by one automated guided vehicle and controlled by a platoon controller. This enables a form of platoon by introducing a concept for dynamic platooning that enables a dynamic use of automated guided vehicles to fulfil transport tasks with several carriers in one transport order. The first automated guided vehicle has sensors used for person safety and navigation, and calculation capabilities to plan paths and localize itself in the environment. The plurality of automated guided vehicles that are designated to follow the first automated guided vehicle do not have sensors used for person safety and navigation, and may have reduced capabilities to plan paths and/or localize themselves in the environment. This reduces the amount of necessary sensors used for person safety and navigation and the computational power and capacity of computers, especially on the second automated guided vehicles.

In accordance with an example embodiment of the present invention, the controller is configured to receive a status report from the first automated guided vehicle and/or the second automated guided vehicle, and to determine a command depending on the status report, and to send the command to the first automated guided vehicle and/or the second automated guided vehicle, wherein the status report comprises at least one of a position and an orientation of the first automated guided vehicle and/or of the second automated guided vehicle, wherein the command comprises at least one of a target speed and a stop signal for the first automated guided vehicle and/or for the second automated guided vehicle. This enables the controller to maintain a distance between the automated guided vehicles.

The controller may be configured to communicate with the first automated guided vehicle by a first telecommunication link that comprises a first wireless link or to communicate with the first automated guided vehicle by an interface of the controller that is connected to a corresponding interface of the first automated guided vehicle. The controller may be implemented on the first automated guided vehicle or on a remote server with communication provided by a telecommunication network infrastructure.

The controller is in one aspect of the present invention configured to communicate with the second automated guided vehicle by a second telecommunication link that comprises a second wireless link.

In accordance with an example embodiment of the present invention, the first automated guided vehicle having sensors used for person safety and navigation is configured to receive a first target position and a first target orientation in a first operating mode, to move to the first target position and the first target orientation in the first operating mode, to switch to a second operating mode, to receive a second target position and a second target orientation, and to lead a second automated guided vehicle and/or a platoon of automated guided vehicles to the second target position and the second target orientation in the second operating mode. The first automated guided vehicle is capable of leading the platoon according to the controller's instructions.

In accordance with an example embodiment of the present invention, the first automated guided vehicle may be configured to send a status report and to receive a command in response to the status report, wherein the status report comprises at least one of a position and an orientation of the first automated guided vehicle and an indication of the first operating mode and an indication of the second operating mode, wherein the command comprises at least one of a target speed for the first automated guided vehicle and the first target position and the first target orientation and the second target position and the second target orientation, and wherein the first automated guided vehicle is configured to act according to the command. Thus, the computational power of the controller is used for calculations that are more complex.

The sensor, used for person safety and navigation in one aspect, is configured to determine the position and the orientation of the first automated guided vehicle. The position and orientation is provided in this aspect by the first automated guided vehicle. In a second aspect, the sensor used for person safety and navigation is configured to detect obstacles and their distances to the first automated guided vehicle for guaranteeing safety when the first automated guided vehicle is moving.

In accordance with an example embodiment of the present invention, the first automated guided vehicle may be configured to communicate with a controller by a first telecommunication link that comprises a first wireless link or to communicate with a controller by an interface of the first automated guided vehicle that is connected to a corresponding interface of the controller when implemented on the first automated guided vehicle. The second automated guided vehicle not having sensors used for person safety and navigation is configurable or configured to move in a platoon of automated guided vehicles, wherein the second automated guided vehicle is configured to receive a command to join the platoon of automated guided vehicles and/or to follow a first automated guided vehicle in the platoon of automated guided vehicles, and wherein the second automated guided vehicle comprises at least one sensor that is configured to detect an automated guided vehicle in the platoon of automated guided vehicles and to follow the detected guided vehicle or is configured to determine its position based on measurements and to report its position. This reduces the amount of required sensors, because the vehicle needs only the sensors to follow a vehicle in a platoon.

In accordance with an example embodiment of the present invention, the second automated guided vehicle may comprise at least on sensor that is configured to detect markers, wherein the second automated guided vehicle is configured to follow the markers until detecting the automated guided vehicle in the platoon of automated guided vehicles. This enables the second automated guided vehicle to move automatically to join the platoon.

In accordance with an example embodiment of the present invention, a method of guiding a platoon of automated guided vehicles comprises providing, by a controller, a first target position and a first target orientation to a first automated guided vehicle having sensors used for person safety and navigation that is configurable or configured to lead a platoon of automated guided vehicles, and sending, by the controller, to a second automated guided vehicle not having sensors used for person safety and navigation a command to join the platoon of automated guided vehicles and/or to follow the first automated guided vehicle in the platoon of automated guided vehicles. This reduces the amount of computational power and sensors required in the vehicles of the platoon.

In accordance with an example embodiment of the present invention, the method may comprise receiving, by the controller, a status report from the first automated guided vehicle and/or the second automated guided vehicle, and determining, by the controller, a command depending on the status report, and sending, by the controller, the command to the first automated guided vehicle and/or the second automated guided vehicle, wherein the status report comprises at least one of a position and an orientation of the first automated guided vehicle and/or of the second automated guided vehicle, wherein the command comprises at least one of a target speed and a stop signal for the first automated guided vehicle and/or for the second automated guided vehicle. This enables the controller to control the movement of the platoon better.

In accordance with an example embodiment of the present invention, the method may comprise communicating with the first automated guided vehicle by a first telecommunication link that comprises a first wireless link or communicating with the first automated guided vehicle by an interface of the controller that is connected to a corresponding interface of the first automated guided vehicle. This way, the communication is selectable depending on the infrastructure.

In accordance with an example embodiment of the present invention, the method may comprise communicating with the second automated guided vehicle by a second telecommunication link that comprises a second wireless link.

In accordance with an example embodiment of the present invention, a method for a first automated guided vehicle having sensors used for person safety and navigation, comprises receiving a first target position and a first target orientation in a first operating mode, moving to the first target position and the first target orientation in the first operating mode, switching to a second operating mode, receiving a second target position and a second target orientation, and leading a second automated guided vehicle not having sensors used for person safety and navigation and/or a platoon of automated guided vehicles not having sensors used for person safety and navigation to the second target position and the second target orientation in the second operating mode. Thus, the first automated guided vehicle is leading the platoon according to the instructions from the controller.

In accordance with an example embodiment of the present invention, the method for the first automated guided vehicle may further comprise sending a status report and receiving a command in response to the status report, wherein the status report comprises at least one of a position and an orientation of the first automated guided vehicle and an indication of the first operating mode and an indication of the second operating mode, wherein the command comprises at least one of a target speed for the first automated guided vehicle and the first target position and the first target orientation and the second target position and the second target orientation, and acting according to the command. This transfers information for computationally expensive calculations to the controller.

The method for the first automated guided vehicle may further comprise determining, by at least one sensor in particular the sensor used for person safety and navigation of the first automated guided vehicle, the position and the orientation of the first automated guided vehicle. This improves the precision of the movement.

The method for the first automated guided vehicle may further comprise communicating with a controller by a first telecommunication link that comprises a first wireless link or communicating with a controller by an interface of the first automated guided vehicle that is connected to a corresponding interface of the controller. This increases the flexibility, because vehicle-to-vehicle communication or a communication by the infrastructure of a telecommunication network may be used.

In accordance with an example embodiment of the present invention, a method for a second automated guided vehicle not having sensors used for person safety and navigation, wherein the second automated guided vehicle is configurable or configured to move in a platoon of automated guided vehicles, comprises receiving a command to join the platoon of automated guided vehicles and/or to follow a first automated guided vehicle having sensors used for person safety and navigation in the platoon of automated vehicles, and detecting, by at least one sensor in particular of the second automated guided vehicle, an automated guided vehicle in the platoon of automated guided vehicles and following the detected guided vehicle or determining its position based on measurements and reporting its position. This enables the participation in a platoon where the first automated guided vehicle that leads the platoon has sensors used for person safety and navigation and no additional sensors used for person safety and navigation are required at the second automated guided vehicle.

In accordance with an example embodiment of the present invention, the method for the second automated guided vehicle may further comprise detecting, by at least one sensor in particular of the second automated guided vehicle, markers, and following the markers until detecting the automated guided vehicle in the platoon of automated guided vehicles. This enables automatic movement without control by the controller during a docking phase/the first operating mode, or with less control by the controller during the following phase/the second operating mode.

The method for the second automated guided vehicle may further comprise sending a status report and receiving a command in response to the status report, wherein the status report comprises at least one of a position and an orientation of the second automated guided vehicle, wherein the command comprises at least one of a target speed for the second automated guided vehicle and an emergency-stop signal for the second automated guided vehicle and an instruction to leave the platoon, and acting according to the command. This transfers information for computationally expensive calculations to the controller.

In accordance with an example embodiment of the present invention, a computer program that comprises computer executable instructions that when executed by a computer cause the computer to perform steps in one of the methods is provided as well.

Further embodiments are derivable from the following description and the figures.

BRIEF DESCRIPTION OF THE DRAWINGS

FIG. 6 schematically depicts steps in a method of leaving a platoon, in accordance with an example embodiment of the present invention.

DETAILED DESCRIPTION OF EXAMPLE EMBODIMENTS

Figure 1:
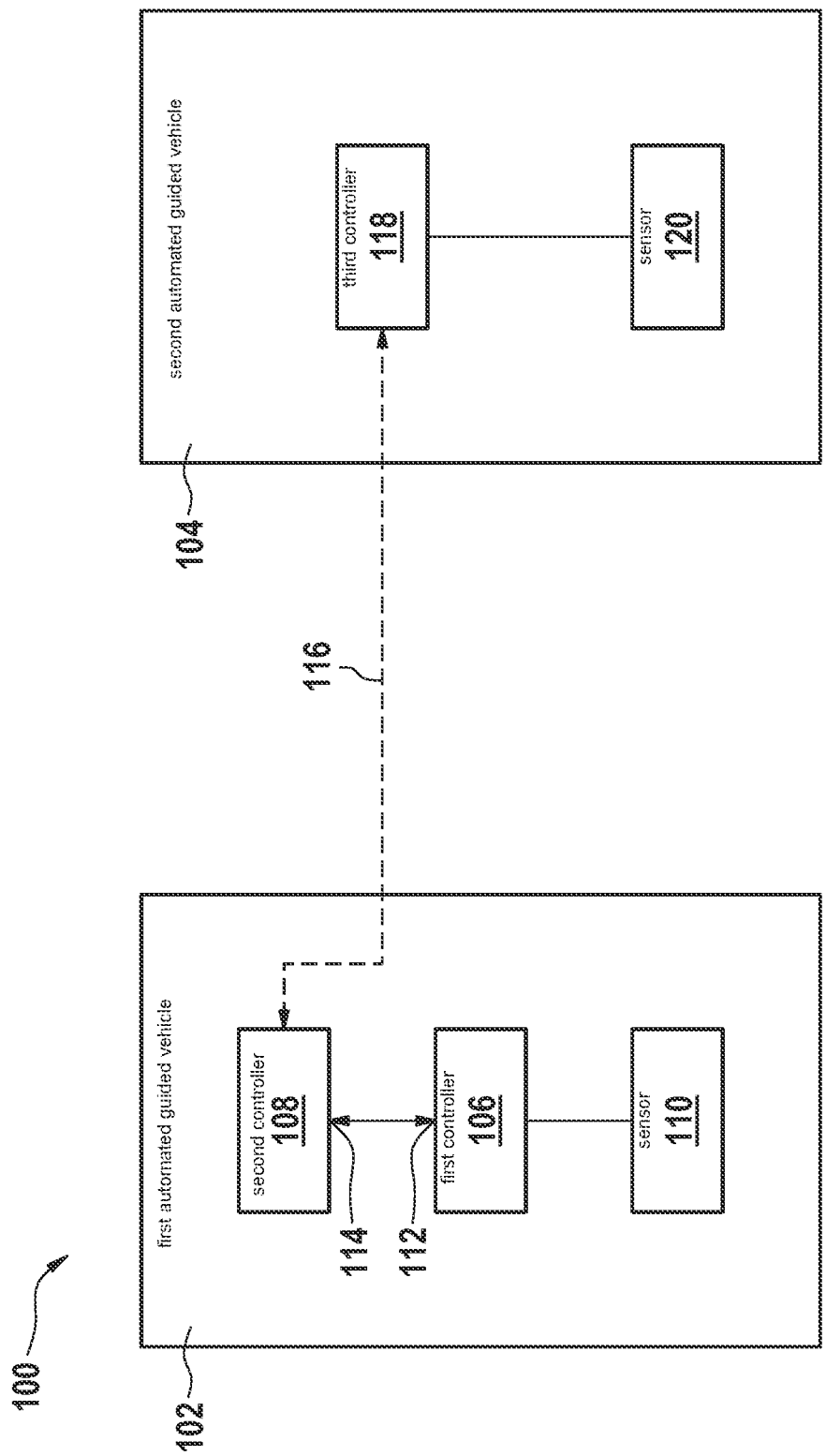
FIG. 1 schematically depicts parts of a platoon of automated guided vehicles according to a first embodiment of the present invention.

FIG. 1 schematically depicts parts of a platoon 100 of automated guided vehicles according to a first embodiment.

The platoon 100 comprises a first automated guided vehicle 102 having sensors used for person safety and navigation and one or more other automated guided vehicles not having sensors used for person safety and navigation. The first automated guided vehicle is a designated leading vehicle. The platoon 100 has one leading vehicle and may have a plurality of vehicles that are designated to follow the leading vehicle. By way of example, a second automated guided vehicle 104 is depicted in FIG. 1. The second automated vehicle is a vehicle designated to follow a leading vehicle. The second automated guided vehicle not necessarily is a second vehicle in the order in which the vehicles move in the platoon.

The first automated guided vehicle 102 comprises a first controller 106 and a second controller 108. The first automated guided vehicle 102 comprises at least one sensor used for person safety and navigation 110. The at least one sensor used for person safety and navigation 110 is in one aspect configured to determine a position x, y and orientation θ of the first automated guided vehicle 102. In the example, the sensor used for person safety and navigation 110 comprises a velocity sensor, an absolute or relative position sensor, an orientation sensor, and a laser scanner. The at least one sensor used for person safety and navigation 110 is configured to determine absolute and relative positions of the first automated guided vehicle 102. For example, the laser scanner is configured for localization and safety.

In the first embodiment, the first automated guided vehicle 102 is configured to communicate with the second controller 108 by an interface 112 of the first automated guided vehicle 102 that is connected to a corresponding interface 114 of the second controller 108. In the example, the first controller 106 comprises the corresponding interface 114.

In the first embodiment, the first automated guided vehicle 102 is configured to communicate with the second automated guided vehicle 104 by a telecommunication link that comprises a wireless link 116. The wireless link 116 may be according to 5G NR PC5 or IEEE 802.11p. Any other type or mode of wireless link may be used alike.

The second controller 108 is configured to send a command to follow the first automated guided vehicle 102 and/or to join the platoon 100 to the second automated guided vehicle 104.

When the platoon 100 consists of the first automated guided vehicle 102 and the second automated guided vehicle 104, the command to join the platoon 100 and the command to follow the first automated guided vehicle 102 instruct the second automated guided vehicle 104 to follow the first automated guided vehicle 102. When the platoon 100 comprises more automated guided vehicles that follow the first automated guided vehicle 102 in a certain order, the command to join the platoon 100 may instruct the second automated guided vehicle 102 to follow a last of the automated guided vehicles in the order. When the platoon 100 comprises more automated guided vehicles that follow the first automated guided vehicle 102 in a certain order, the command to follow the first automated guided vehicle 102 may instruct the second automated guided vehicle 104 to follow the first automated guided vehicle 102 as the first follower in the order.

The second automated guided vehicle 104 comprises a third controller 118. The third controller 118 is in one aspect configured to receive the command. The second controller 108 and the third controller 118 may be configured to communicate by the telecommunication link with each other.

The second automated guided vehicle 104 is in the example configured to move in the platoon 100 after the command is received. The second automated guided vehicle 104 comprises at least one sensor 120. In the example, the second automated guided vehicle 104 comprises a velocity sensor, an absolute or relative position sensor and an orientation sensor.

The second automated guided vehicle 104 comprises at least one sensor 120 that is configured to detect an automated guided vehicle in the platoon 100. The third controller 118 is configured to control the second automated guided vehicle 104 according to follow the detected automated guided vehicle in the platoon 100.

The third controller 118 may be configured to determine the automated guided vehicle that the second automated guided vehicle 104 shall follow according to the command from sensor information of the at least one sensor 120.

In one aspect, the at least one sensor 120 is configured to detect markers. In this aspect, the second automated guided vehicle 104 is configured to follow the markers until detecting the automated guided vehicle in the platoon of automated guided vehicles. The at least one sensor 120 may be configured to detect markers on a floor.

The first automated guided vehicle 102 in particular the second controller 108 may be configured to receive instructions for forming and/or operating the platoon 100. The instructions in the example identify the first automated guided vehicle 102 and the second automated guided vehicle 104 that the platoon 100 comprises. The instructions may identify any other automated guided vehicle as well. These instructions may be received via a wireless interface, e.g. an IEEE 802.11x interface that is not depicted in FIG. 1. x in this context refers to an arbitrary mode of IEEE 802.11 standard. The instructions may comprise information defining an order of automated guided vehicles in the platoon 100, a route to locations where the different automated guided vehicles that shall form the platoon 100 shall be picked-up, a route that the platoon 100 shall take, locations where the different automated guided vehicles that form the platoon 100 shall leave the platoon 100. The locations and/or route information may be provided by target positions of the automated guided vehicles. Respective orientations of the automated guided vehicles may be given as well.

The first automated guided vehicle 102 is configured to receive a first target position x_t, y_t and a first target orientation θ_t in a first operating mode. In the example, the first controller 106 is configured to receive the first target position x_t, y_t and the first target orientation θ_t from the second controller 108.

The first automated guided vehicle 102 is configured to move to the first target position x_t, y_t and the first target orientation θ_t in the first operating mode. In the example, the first controller 106 is configured to move the first automated guided vehicle 102 accordingly.

The first automated guided vehicle 102 is configured to switch to a second operating mode. The first automated guided vehicle 102 may be configured to switch to other operating modes as well. These include e.g. a third operating mode for an emergency stop or a fourth operating mode for leaving the platoon. In the example, the first controller 106 is configured to switch the first automated guided vehicle 102 from one of these operating modes to any other of the operating modes.

The first automated guided vehicle 102 is configured to receive a second target position x_t, y_t and a second target orientation θ_t. In the example, the first controller 106 is configured to receive the second target position x_t, y_t and the second target orientation θ_t from the second controller 108.

The first automated guided vehicle 102 is configured to lead at least the second automated guided vehicle 104 to the second target position x_t, y_t and the second target orientation θ_t in the second operating mode.

In one aspect, the first automated guided vehicle 102 is configured to lead the automated guided vehicles in the platoon 100 to the second target position x_t, y_t and the second target orientation θ_t in the second operating mode.

Figure 2:
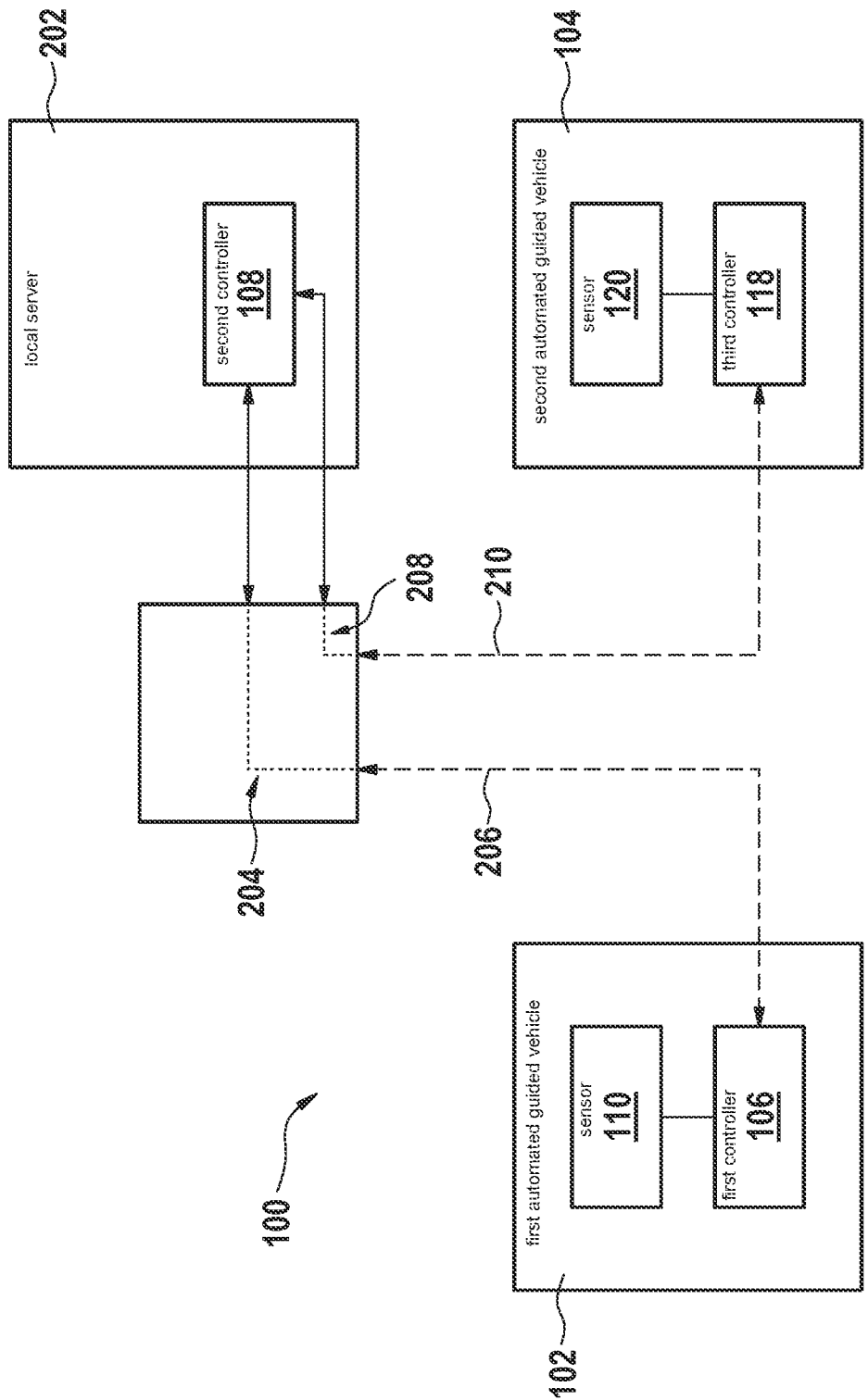
FIG. 2 schematically depicts parts of the platoon of automated guided vehicles according to a second embodiment of the present invention.

FIG. 2 schematically depicts parts of the platoon 100 of automated guided vehicles according to a second embodiment. In FIG. 2, elements of the second embodiment that have the same structure or function of corresponding elements in the first embodiment are labelled with the same reference numeral that is used in FIG. 1 and not explained again.

The platoon 100 according to the second embodiment differs from the embodiment according to the first embodiment in that the second controller 108 is external to the automated guided vehicles. The second controller 108 is in the example on a local server 202. The second controller 108 may be on an edge cloud of a radio access network as well. The first automated guided vehicle 102 is configured to communicate with the external second controller 108 by a first telecommunication link 206 that comprises a first wireless link 206. The second automated guided vehicle 104 is configured to communicate with the external second controller 108 by a second telecommunication link 208 that comprises a second wireless link 210.

A 5G System may be used for these links. The entry to a 5G telecommunication system for the first telecommunication link 204 and/or the second telecommunication link 208 may be according to 5G NG6. The first wireless link 206 and the second wireless link 210 may be according to 5G-NR Uu.

In the example, the first controller 106 and the external second controller 108 are configured to communicate with each other by the first telecommunication link 204. In the example, the third controller 118 and the external second controller 108 are configured to communicate with each other by the second telecommunication link 208.

The second controller 108 may communicate by Ethernet or any other telecommunication link to receive the instructions for forming and/or operating the platoon 100. This link is not illustrated in FIG. 2.

The second controller 108 is capable of platooning the automated guided vehicles dynamically. The second controller 108 controls the automated guided vehicles to fulfil transport tasks with several carriers in one transport order. It is not mandatory that the automated guided vehicles are all equipped with the same level of sensors and intelligence. The automated guided vehicles are controlled to act as a platoon. In the platoon, the first automated guided vehicle 102 is equipped with sensors and intelligence. The vehicle or vehicles that follow the first vehicle may have less sensors and/or functionalities. The first automated guided vehicle 102 comprises in one aspect all necessary safety equipment, e.g. a laser scanner. The first automated guided vehicle 102 is in one aspect able to detect objects, to plan trajectories to drive around obstacles and to locate itself, while the second automated guided vehicle 104 or the other automated guided vehicles of the platoon 100 are not. An amount of necessary safety equipment, e.g. laser scanners, and a corresponding amount of computational power and capacity of a computer on the automated guided vehicles that follow the first automated guided vehicle 102 in the platoon is therefore reduced.

The first automated guided vehicle 102 is in one aspect configured to determine a status report from sensor data of the at least one sensor used for person safety and navigation 110. In one aspect, the status report comprises a position x, y and an orientation θ of the first automated guided vehicle 102. In one aspect, the status report comprises an indication of an operating mode that the first automated guided vehicle 102 is in. This may be the first, second, third or fourth operating mode. The first automated guided vehicle 102 is in this aspect configured to send the status report to the second controller 108.

The first automated guided vehicle 102 is in one aspect configured to receive a command from the second controller 108 in response to the status report. The command may comprise a target speed for the first automated guided vehicle 102, or a stop signal for the first automated guided vehicle 102. The command may comprise the first target position x_t, y_t, the first target orientation θ_t, the second target position x_t, y_t, or the second target orientation θ_t. In this aspect, the first automated guided vehicle 102 is configured to act according to the command.

Figure 3:
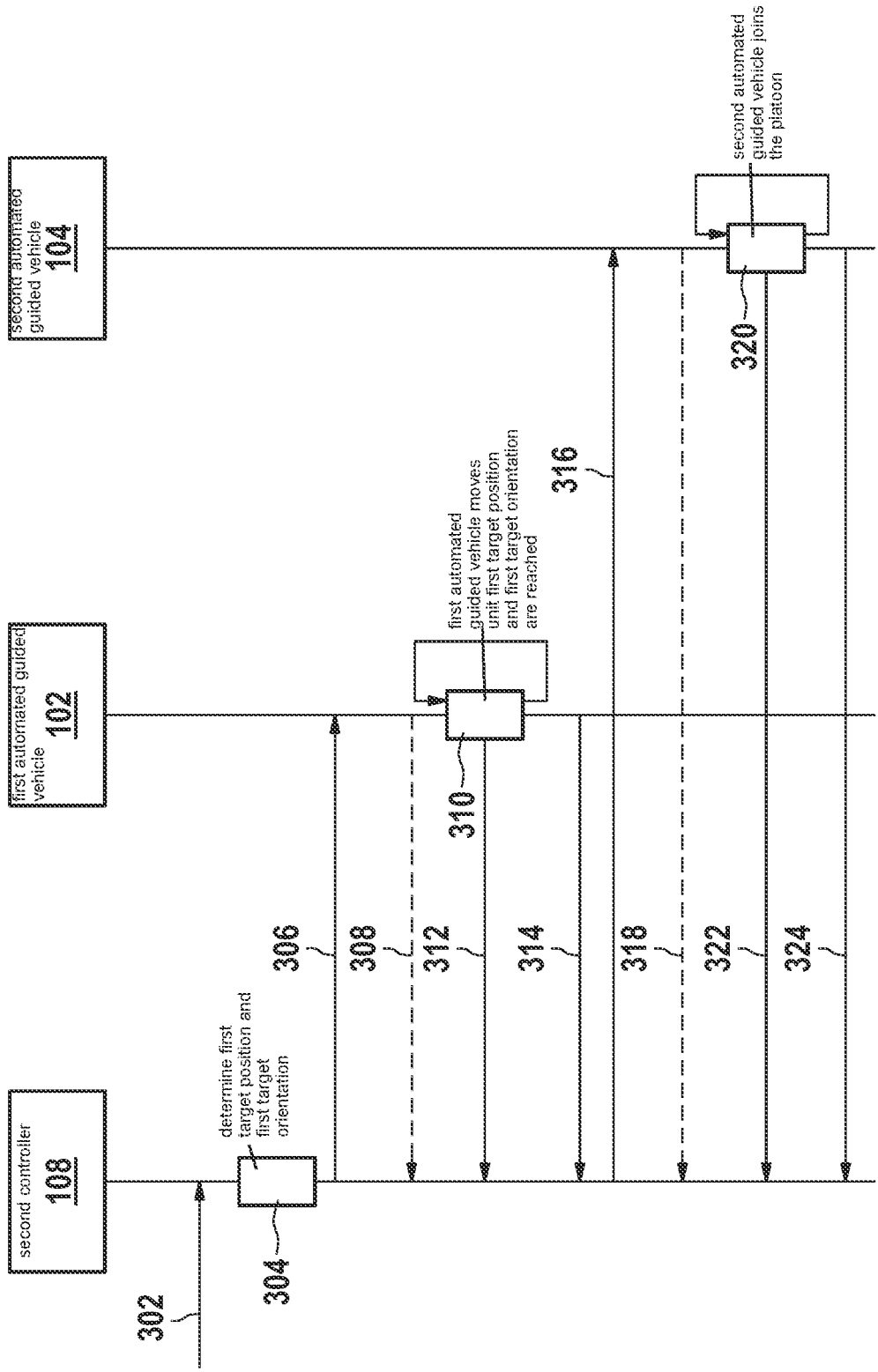
FIG. 3 schematically depicts steps in a method of platoon creation, in accordance with an example embodiment of the present invention.

FIG. 3 schematically depicts steps in a method of platoon creation.

In a step 302, the instructions to form and/or operate the platoon 100 are received by the second controller 108. Afterwards, a step 304 is executed.

In the step 304, the first target position x_t, y_t and the first target orientation θ_t is determined by the second controller 108.

Afterwards, a step 306 is executed.

In the step 306, the first target position x_t, y_t and the first target orientation θ_t is sent by the second controller 108 to the first automated guided vehicle 102.

Optionally, upon receipt of the first target position x_t, y_t and the first target orientation θ_t, a confirmation 308 of the receipt of the first target position x_t, y_t and the first target orientation θ_t is sent by the first automated guided vehicle 102 to the second controller 108.

Afterwards, a step 310 is executed.

In the step 310, the first automated guided vehicle 102 moves until the first target position x_t, y_t and the first target orientation θ_t is reached. The first automated guided vehicle 102 uses the sensors for person safety and navigation 110 while moving.

The first automated guided vehicle 102 may be operating in the first operating mode or may be switched to the first operating mode upon receipt of the first target position x_t, y_t and the first target orientation θ_t.

In particular during the first operating mode, the first automated guided vehicle 102 sends a status report 312 comprising a position orientation or speed of the first automated guided vehicle 102. This information is in the example determined from the at least one sensor used for person safety and navigation 110 of the first automated guided vehicle 102. The status report 312 may be sent once or repeatedly while the first automated guided vehicle 102 operates in the first operating mode.

When, the first automated guided vehicle 102 arrives at the first target position x_t, y_t and the first target orientation θ_t is reached, a step 314 is executed.

In step 314, the first automated guided vehicle 102 sends a confirmation to the second controller 108 that indicates that the target position is reached.

Upon receipt of this confirmation, the second controller 108 sends a command 316 to join the platoon 100 of automated guided vehicles and/or to follow the first automated guided vehicle 102 in the platoon 100 of automated guided vehicles.

Optionally, upon receipt of this command, a confirmation 318 of the receipt of this command is sent by the second automated guided vehicle 104 to the second controller 108.

Afterwards, the second automated guided vehicle 104 joins the platoon 100 in step 320. The second automated guided vehicle 104 may detect the automated guided vehicle that it shall follow and join the platoon 100. The second automated guided vehicle 104 may follow the markers to move to the platoon 100 and join the platoon 100 upon detection of the automated guided vehicle that it shall follow. In the example, the second automated guided vehicle 104 joins the platoon 100, when the first automated guided vehicle 102 is detected to be located in front of the second automated guided vehicle 104 in the correct orientation.

Optionally, the second automated guided vehicle 104 may send a status report 322 comprising a position orientation or speed of the second automated guided vehicle 104. This information is in the example determined from the at least one sensor 120 of the second automated guided vehicle 104. The status report 322 may be sent once or repeatedly until the second automated guided vehicle 104 joins the platoon 100.

After the second automated guided vehicle 104 has joined the platoon 100, a confirmation 324 may be sent by the second automated guided vehicle 104 to the second controller 108.

Figure 4:
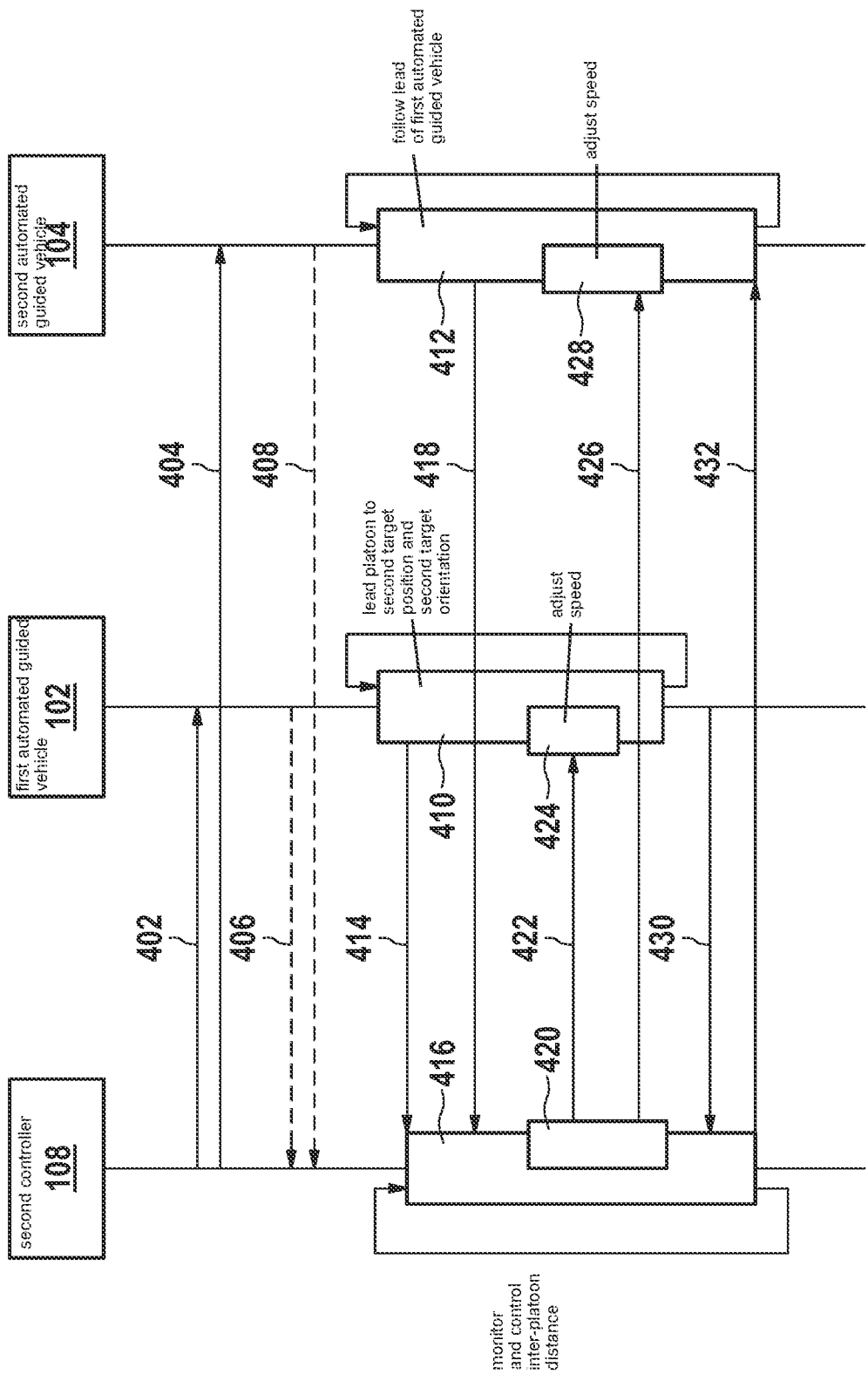
FIG. 4 schematically depicts steps in a method of platoon driving, in accordance with an example embodiment of the present invention.

FIG. 4 schematically depicts steps in a method of platoon driving.

The method of platoon driving may start after the platoon 100 is formed with the method described above.

In a step 402, the second target position x_t, y_t and the second target orientation θ_t is sent by the second controller 108 to the first automated guided vehicle 102. In a step 404, the command to follow the first automated guided vehicle 102 is sent by the second controller 108 to the second automated guided vehicle 104. The first automated guided vehicle 102 may switch to the second operating mode upon receipt of the second target position x_t, y_t and the second target orientation θ_t. In one aspect, the second automated guided vehicle 104 or any other following vehicle in the platoon 100 may also change to a second operating mode. In the case of the second automated guided vehicle 104, the second operating mode may be a mode to follow the platoon.

Optionally, a confirmation 406 of the receipt of the second target position x_t, y_t and the second target orientation θ_t is sent by the first automated guided vehicle 102 to the second controller 108. Optionally, a confirmation 408 of the receipt of the command to follow the first automated guided vehicle 102 is sent to the second controller 108 by the second automated guided vehicle 104.

In a step 410, the first automated guided vehicle 102 leads the platoon 100 to the second target position x_t, y_t and the second target orientation θ_t. The first automated guided vehicle 102 uses the at least one sensor for person safety and navigation 110 to locate the second target position x_t, y_t and the second target orientation θ_t and navigate to the second target position x_t, y_t and the second target orientation θ_t. The first automated guided vehicle 102 uses the sensors for person safety and navigation 110 while moving.

In a step 412, the second automated guided vehicle 104 follows the lead of the first automated guided vehicle 102. The second automated guided vehicle 104 uses the at least one sensor 120 to locate the first automated guided vehicle 102 and to follow its lead.

Both vehicles may determine status information comprising, among others, their respective position x, y or orientation θ or speed and/or a distance between the first automated guided vehicle 102 and the second automated guided vehicle 104.

In the example, the first automated guided vehicle 102 sends a status report 414 including the status information determined by the first automated guided vehicle 102 to the second controller 108. The status report 414 may be sent in particular repeatedly while the first automated guided vehicle 102 is moving. The status report 414 may include an indication that the first automated guided vehicle 102 is in the second operating mode. In the example, the second automated guided vehicle 104 sends a status report 418 including the status information determined by the second automated guided vehicle 104 to the second controller 108 while moving. The status report 418 may be sent in particular repeatedly while the second automated guided vehicle 104 is moving.

The second controller 108 monitors and controls an inter-platoon distance in steps 416 and 420, respectively. The steps 416 and 420 may be executed repeatedly. The steps 416 and 420 may be executed upon receipt of a status report from any of the automated guided vehicles of the platoon 100. In the example, a target speed is determined in step 420 for the first automated guided vehicle 102 and/or the second automated guided vehicle 104 depending on the content of the status reports of the first automated guided vehicle 102 and the second automated guided vehicle 104. In one example, the target speed for the first automated guided vehicle 102 is increased with respect to a present speed of the first automated guided vehicle 102 or the second automated guided vehicle 104, if the distance between the first automated guided vehicle 102 and the second automated guided vehicle 104 is below a threshold. In one example, the target speed for the first automated guided vehicle 102 is reduced with respect to a present speed of the first automated guided vehicle 102 or the second automated guided vehicle 104, if the distance between the first automated guided vehicle 102 and the second automated guided vehicle 104 is above a threshold. In one example, the target speed for the second automated guided vehicle 104 is increased with respect to a present speed of the second automated guided vehicle 104 or the first automated guided vehicle 102, if the distance between the first automated guided vehicle 102 and the second automated guided vehicle 104 is above a threshold. In one example, the target speed for the second automated guided vehicle 104 is reduced with respect to a present speed of the second automated guided vehicle 104 or the first automated guided vehicle 102, if the distance between the first automated guided vehicle 102 and the second automated guided vehicle 104 is below a threshold.

The target speeds may be adjusted to absolute values that are calculated to reduce or increase the distance as well.

In case a target speed is determined for the first automated guided vehicle 102, the target speed is sent to the first automated guided vehicle 102 in a step 422 and the first automated guided vehicle 102 adjusts its speed according to the target speed in a step 424.

In case a target speed is determined for the second automated guided vehicle 104, the target speed is sent to the second automated guided vehicle 104 in a step 426 and the second automated guided vehicle 104 adjusts its speed according to the target speed in a step 428.

The steps 414 to 428 may be repeated.

When the first automated guided vehicle 102 arrives at the second target position x_t, y_t and is in the second target orientation θ_t, the first automated guided vehicle 102 stops and sends a confirmation 430 to the second controller 108.

In response to the receipt of the confirmation 430 by the second controller 108, the second controller 108 sends a command 432 to the second automated guided vehicle 104 to stop the second automated guided vehicle 104. Upon receipt of the command 432 to stop the second automated guided vehicle 104, the second automated guided vehicle 104 stops.

Figure 5:
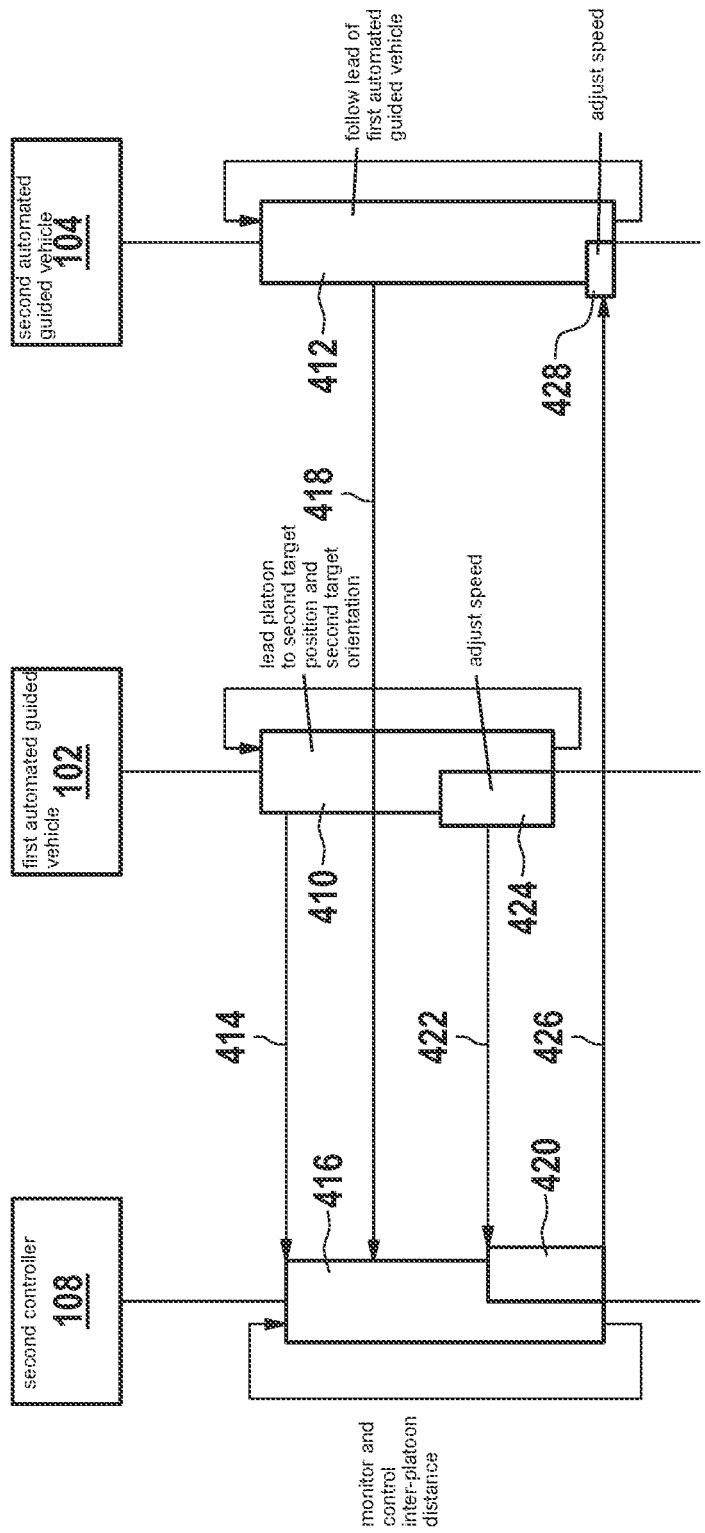
FIG. 5 schematically depicts steps in a method of emergency stopping a platoon, in accordance with an example embodiment of the present invention.

FIG. 5 schematically depicts steps in a method of emergency stopping the platoon 100. According to the example depicted in FIG. 5, the platoon 100 is formed and the vehicles started moving as described for steps 410 and 412 above. In the example, the steps 414 to 428 have been executed at least once. The steps 414 to 428 may have been executed repeatedly or not once as well.

When the first automated guided vehicle 102 determines a safety issue e.g. by the sensors used for person safety and navigation 110, a command to report a safety alarm is sent in the step 422 by the first automated guided vehicle 102 to the second controller 108. The first automated guided vehicle 102 stops automatically in step 424 and once it stops or during it is stopping a command to emergency-stop the second automated guided vehicle 104 is sent in the step 426 by the second controller 108. Upon receipt of these commands, the second automated guided vehicle 104 is stopped in emergency mode in the step 428.

FIG. 6 schematically depicts steps in a method of leaving the platoon 100.

The method of leaving the platoon 100 is preferably executed after the second target position x_t, y_t and the second target orientation θ_t are reached.

In one aspect, the method is started after the command 432 to stop the second automated guided vehicle 104 has been sent by the second controller 108.

In a step 602, the second controller 108 sends a command to stop following the first automated guided vehicle 102 to the second automated guided vehicle 104.

In an optional step 604, the second automated guided vehicle 104 sends a confirmation to the second controller 108 that it stops following the first automated guided vehicle 102. The second automated guided vehicle 104 stops following the first automated guided vehicle 102 in the example. The second automated guided vehicle 104 can change to parking mode, or can be requested to join a new platoon. These options are not illustrated in the example.

In a step 606, the second controller 108 sends a command to move to a third target position x_t, y_t and a third target orientation θ_t to the first automated guided vehicle 102.

In an optional step 608, the first automated guided vehicle 102 sends a confirmation to the second controller 108 that it moves to the third target position x_t, y_t and the third target orientation θ_t. The first automated guided vehicle 102 moves in the example to the third target position x_t, y_t and the third target orientation θ_t.

In case that the platoon 100 comprises more vehicles that follow the first automated guided vehicle 102, individual vehicles may be picked-up or dropped-off at various different locations. Any of these vehicles may be commanded to leave the platoon 100 at any of the locations in particular according to a route set by an operator or an overarching function. When vehicles are commanded to join the platoon 100 at the last position in the order or to leave the platoon 100 from the last position in the order, the method of platoon creation, the method of platoon driving and the method of leaving the platoon may be executed consecutively in this order. When vehicles are commanded to join the platoon 100 at another than the last position in the order or to leave the platoon 100 from another than the last position in the order, the platoon 100 may be split temporarily by commanding the vehicles accordingly.

Depending on the physical location of the second controller 108, e.g., within the first automated guided vehicle 102 or in the local server 202 external to the first automated guided vehicle 102, the selection of a communication technology may take place. For instance, when locating the second controller 108 external to the first automated guided vehicle 102, direct communication between the external server 202 and the automated guided vehicles of the platoon 100 cannot be selected unless the external server 202 has sending/receiving capabilities configured to directly communicate with these vehicles. On the other hand, if the second controller 108 resides within the first automated guided vehicle 102, direct communication can be considered, as well as the network-assisted communication. The exchanged messages between the second controller 108 and automated guided vehicles may remain the same regardless of the network infrastructure.

Although the examples consider 5G-NR and IEEE 802.11p, other communication technologies could be used, provided that they fulfill the application requirements to the communication service.

Additionally, the first embodiment with direct wireless communication is only an example. Even when the second controller 108 is located within the first automated guided vehicle 102 the communication could be assisted by an infrastructure, e.g. network, if the demanded requirements are available or guaranteed.

In one aspect, the first automated guided vehicle 102 is configured to start to communicate with the second automated guided vehicle 104 once they are in close proximity.

In one aspect, the second automated guided vehicle 104 is configured to slowly move from its start position to an end of the platoon 100. The second automated guided vehicle 104 is for example configured to move with a speed that is limited so that non-safety certified sensors are sufficient.

In one aspect the second automated guided vehicle 104 is following the end of the platoon 100 or the automated guided vehicle in the platoon 100 that is directly in front of the second automated guided vehicle 104 with a given separation distance, e.g. 10 centimeters. Instead of a given separation distance, a maximum and/or a minimum distance may be provided that defines the threshold described above.

In one aspect, the automated guided vehicles of the platoon 100 communicate their respective position, e.g. x, y coordinates, and/or velocities to the second controller 108 periodically.

In one aspect, the second controller 108 is configured to command the vehicles of the platoon 100 to maintain a total length of the platoon 100 that is less than a maximum length and/or more than a minimum length.

In one example, the second controller 108 monitors the state of the platoon 100 regularly, to verify that all the automated guided vehicles follow the first automated guided vehicle by keeping maximum safety distances and/or minimum safety distances amongst each other and to the first automated guided vehicle 102, leading the platoon 100.

In a platoon 100 of four vehicles, a first distance d1 between the first automated guided vehicle 102 and the second automated guided vehicle 104, a second distance d2 between the second automated guided vehicle 104 and a third automated guided vehicle and a third distance d3 between the third automated guided vehicle and a fourth automated guided vehicle are considered.

The minimum distances are needed to avoid crashes between the vehicles in the platoon 100. The maximum distances are needed to avoid people or other vehicles getting in the way of the platoon 100, e.g. between two vehicles. In one aspect, the second controller 108 is configured to mitigate that the distances leave the tolerance band defined by a minimum allowable distance min_distance and a maximum allowable distance max_distance $$\text{min\_distance} \leq \{d1, d2, d3\} \leq \text{max\_distance}$$

In one aspect, the second controller 108 is configured to maintain a safety margin, e.g. regarding acceleration, deceleration, and target speed for the automated guided vehicles in the platoon 100.

In one aspect, the communication between the second controller 108 and the automated guided vehicles takes place over a radio access technology, RAT that provides the latency and reliability requirements to keep the automated guided vehicles within the safety margin. These requirements may vary mainly in dependence of the velocity of the automated guided vehicles.

What is claimed is:

1. A controller configured to guide a platoon of automated guided vehicles, the controller configured to:
provide a first target position and a second target position to a first automated guided vehicle having first sensors, the first automated guided vehicle being configurable or configured to lead a platoon of automated guided vehicles;
send to a second automated guided vehicle having second sensors with reduced capabilities relative to the first sensors to plan paths and/or localize the second automated guided vehicle in an environment a command to join the platoon of automated guided vehicles and/or to follow the first automated guided vehicle in the platoon of automated guided vehicles;
receive a status report from the first automated guided vehicle;
provide a first target orientation and a second target orientation for the first automated guided vehicle;
determine another command depending on the status report; and
send the other command to the first automated guided vehicle;
wherein the status report includes at least one of a position and an orientation of the first automated guided vehicle and an indication of a first operating mode and an indication of a second operating mode, wherein the other command includes at least one of a target speed for the first automated guided vehicle, the first target position, the first target orientation, the second target position, and the second target orientation.

2. A first automated guided vehicle, comprising:
first sensors configured to plan paths and/or localize the first automated guided vehicle in an environment;

wherein the first automated guided vehicle is configured to:
   receive a first target position and a first target orientation in a first operating mode;
   move to the first target position and the first target orientation in the first operating mode;
   switch to a second operating mode;
   receive a second target position and a second target orientation;
   lead a second automated guided vehicle and/or a platoon of automated guided vehicles to the second target position and the second target orientation in the second operating mode;
   send a status report;
   receive a command in response to the status report; and
   act according to the command;
   wherein the status report includes at least one of a position and an orientation of the first automated guided vehicle and an indication of the first operating mode and an indication of the second operating mode, wherein the command includes at least one of a target speed for the first automated guided vehicle, the first target position, the first target orientation, the second target position, and the second target orientation.

3. The first automated guided vehicle according to claim 2, wherein at least one of the first sensors is configured to determine the position and the orientation of the first automated guided vehicle.

4. A method of guiding a platoon of automated guided vehicles, the method comprising the following steps:
   providing by a controller a first target position and a second target position to a first automated guided vehicle having first sensors, the first automated guided vehicle being configurable or configured to lead a platoon of automated guided vehicles;
   sending by the controller to a second automated guided vehicle having second sensors with reduced capabilities relative to the first sensors to plan paths and/or localize the second automated guided vehicle in an environment a command to join the platoon of automated guided vehicles and/or to follow the first automated guided vehicle in the platoon of automated vehicles
   receiving a status report from the first automated guided vehicle;
   providing a first target orientation and a second target orientation for the first automated guided vehicle;
   determining another command depending on the status report; and
   sending the other command to the first automated guided vehicle;
   wherein the status report includes at least one of a position and an orientation of the first automated guided vehicle and an indication of a first operating mode and an indication of a second operating mode, wherein the other command includes at least one of a target speed for the first automated guided vehicle, the first target position, the first target orientation, the second target position, and the second target orientation.

5. The method according to claim 4, further comprising:
   communicating with the second automated guided vehicle by a telecommunication link that comprises a wireless link.

6. A method for a first automated guided vehicle having first sensors, the method comprising the following steps:
   receiving a first target position and a first target orientation in a first operating mode;
   moving to the first target position and the first target orientation in the first operating mode;
   switching to a second operating mode;
   receiving a second target position and a second target orientation; and
   leading to the second target position and the second target orientation in the second operating mode: (i) a second automated guided vehicle having second sensors with reduced capabilities relative to the first sensors to plan paths and/or localize the second automated guided vehicle in an environment, and/or (ii) a platoon of automated guided vehicles having the second sensors;
   sending a status report; and
   receiving a command in response to the status report;
   acting according to the command;
   wherein the status report includes at least one of a position and an orientation of the first automated guided vehicle and an indication of the first operating mode and an indication of the second operating mode, wherein the command includes at least one of a target speed for the first automated guided vehicle, the first target position, the first target orientation, the second target position, and the second target orientation.

7. The method according to claim 6, further comprising:
   determining, by the first sensors of the first automated guided vehicle, the position and the orientation of the first automated guided vehicle.

8. A non-transitory computer-readable medium on which is stored a computer program for guiding a platoon of automated guided vehicles, the computer program, when executed by a computer, causing the computer to perform the following steps:
   providing by a controller a first target position and a second target position to a first automated guided vehicle having first sensors that is configurable or configured to lead a platoon of automated guided vehicles; and
   sending by the controller to a second automated guided vehicle having second sensors with reduced capabilities relative to the first sensors to plan paths and/or localize the second automated guided vehicle in an environment a command to join the platoon of automated guided vehicles and/or to follow the first automated guided vehicle in the platoon of automated vehicles
   receiving a status report from the first automated guided vehicle;
   providing a first target orientation and a second target orientation for the first automated guided vehicle;
   determining another command depending on the status report; and
   sending the other command to the first automated guided vehicle;
   wherein the status report includes at least one of a position and an orientation of the first automated guided vehicle and an indication of a first operating mode and an indication of a second operating mode, wherein the other command includes at least one of a target speed for the first automated guided vehicle, the first target position, the first target orientation, the second target position, and the second target orientation.

* * * * *